United States Patent
Heisele et al.

(10) Patent No.: US 9,727,793 B2
(45) Date of Patent: Aug. 8, 2017

(54) SYSTEM AND METHOD FOR IMAGE BASED VEHICLE LOCALIZATION

(71) Applicant: HONDA MOTOR CO., LTD., Tokyo (JP)

(72) Inventors: Bernd Heisele, Mountain View, CA (US); Ali Taalimi, Knoxville, TN (US)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 14/970,251

(22) Filed: Dec. 15, 2015

(65) Prior Publication Data

US 2017/0169300 A1    Jun. 15, 2017

(51) Int. Cl.
*G06K 9/00* (2006.01)
*G06T 17/05* (2011.01)

(52) U.S. Cl.
CPC .......... *G06K 9/00791* (2013.01); *G06T 17/05* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,094,508 A | 7/2000 | Acharya et al. | |
| 8,503,762 B2 * | 8/2013 | Ben Tzvi | G06T 19/006 382/154 |
| 9,201,424 B1 | 12/2015 | Ogale | |
| 2003/0191568 A1 | 10/2003 | Breed | |
| 2008/0204557 A1 * | 8/2008 | Kubota | B60R 1/00 348/148 |
| 2009/0086019 A1 * | 4/2009 | Okabe | B60R 1/00 348/118 |
| 2010/0014712 A1 | 1/2010 | Sampedro Diaz et al. | |
| 2012/0050489 A1 * | 3/2012 | Gupta | G06K 9/00798 348/46 |
| 2013/0156329 A1 | 6/2013 | Szeliski et al. | |
| 2014/0379247 A1 * | 12/2014 | Ferguson | B60W 30/09 701/301 |
| 2015/0142248 A1 * | 5/2015 | Han | G01C 21/3602 701/23 |

OTHER PUBLICATIONS

International Search Report and Written Opinion of International Patent Application No. PCT/US2016/066632, dated Mar. 2, 2017.

* cited by examiner

*Primary Examiner* — Shervin Nakhjavan
(74) *Attorney, Agent, or Firm* — Arent Fox LLP

(57) ABSTRACT

Methods and systems for determining a vehicle location and pose are provided. A vehicle localization system may determine a location and pose estimate for the vehicle. The system may retrieve three-dimensional map data based on the location and pose estimate. The system may obtain a camera image from a vehicle mounted camera. The system may project the three-dimensional map data onto the camera image based on the location and pose estimate. The system may compare the projected three-dimensional map data to the camera image. The system may then determine the vehicle location and pose based on the comparing.

18 Claims, 14 Drawing Sheets

SYSTEM AND METHOD FOR IMAGE BASED VEHICLE LOCALIZATION

BACKGROUND

Vehicle navigation systems typically use a satellite based location system to determine the location of the vehicle. Such systems have known drawbacks regarding locations where satellite signals are unavailable or weak.

Image based localization has been proposed as another method of determining a location of a vehicle. Previous image based localization techniques for vehicles have used inverse perspective mapping (IPM) to transform a camera image from a vehicle mounted camera into a top down image or bird's eye view image. The top down image may then be compared to known lane markings to determine the location of the vehicle.

IPM based localization techniques may have drawbacks because the IPM relies on known or assumed characteristics. For example, IPM techniques assume that the road is flat and that the camera pitch and yaw are known. These assumptions may not hold up in real world driving conditions. Further, the IPM image may only be compared to planar features (e.g., lane markings), which may not always be available or sufficient.

SUMMARY

According to one aspect, the disclosure provides a method of determining a vehicle location and pose. The method may include determining a location and pose estimate for the vehicle. The method may further include retrieving three-dimensional map data based on the location and pose estimate. The method may also include obtaining a camera image from a vehicle mounted camera. The method may additionally include projecting the three-dimensional map data onto the camera image based on the location and pose estimate. The method may further include comparing the projected three-dimensional map data to the camera image. The method may also include determining the vehicle location and pose based on the comparing.

In another aspect, the disclosure provides a system for determining a location and pose of a vehicle. The system may include a global positioning system receiver configured to determine a location and pose estimate for the vehicle. The system may also include a map database configured to provide three-dimensional map data based on the location and pose estimate. The system may further include a vehicle mounted camera configured to obtain a camera image. The system may additionally include a processor communicatively coupled to a memory. The processor may be configured to project the three-dimensional map data onto the camera image based on the location and pose estimate. The processor may be further configured to compare the projected three-dimensional map data to the camera image. The processor may also be configured to determine the vehicle location and pose based on the comparing.

In yet another aspect, the disclosure provides a non-transitory computer-readable medium storing computer executable code for determining a vehicle location and pose. The computer-readable medium may include code for determining a location and pose estimate; retrieving three-dimensional map data based on the location and pose estimate; obtaining a camera image from a vehicle mounted camera; projecting the three-dimensional map data onto the camera image based on the location and pose estimate; comparing the projected three-dimensional map data to the camera image; and determining the vehicle location and pose based on the comparing.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
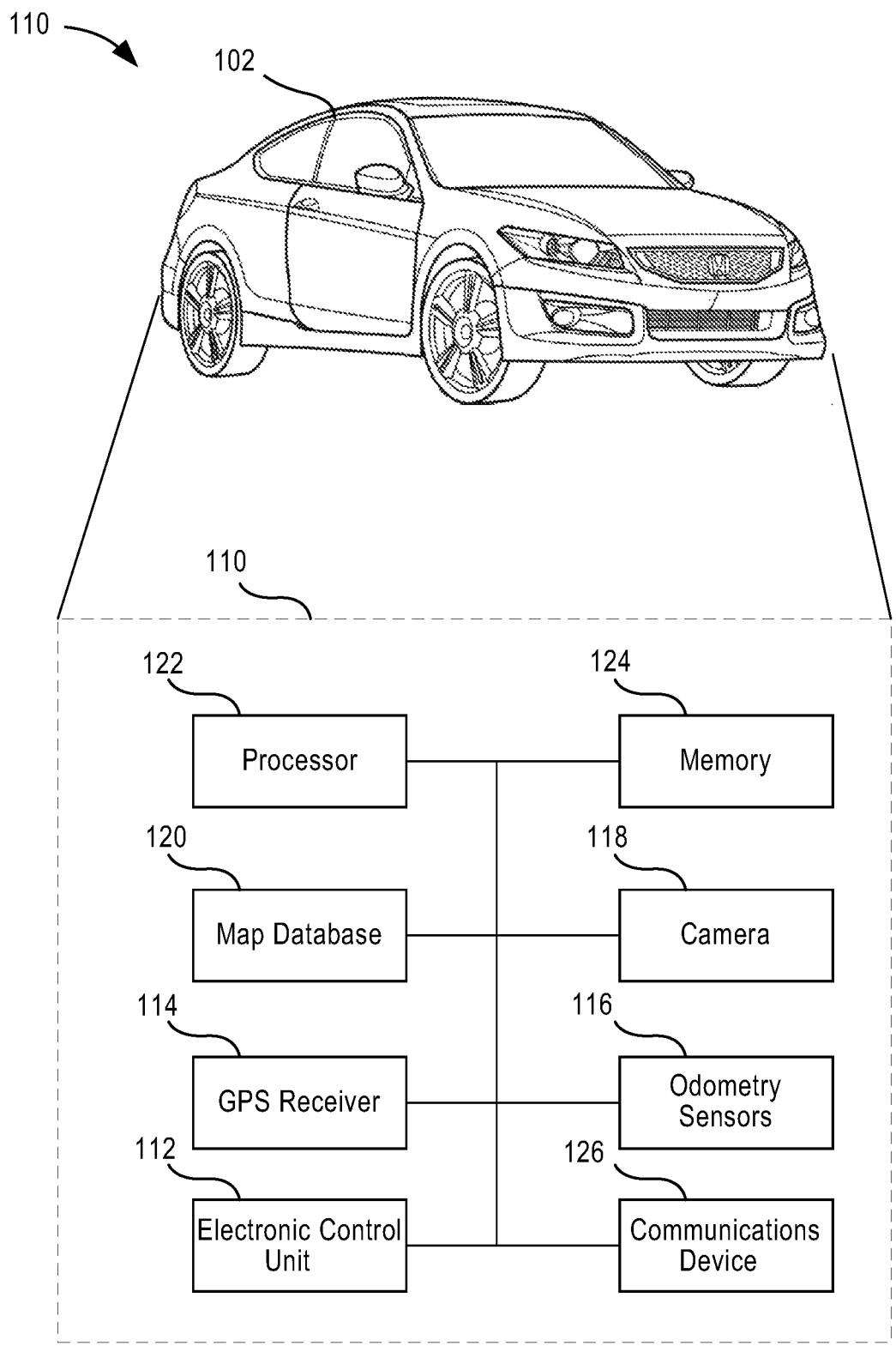
FIG. 1 illustrates a schematic view of an example operating environment of a localization system.

The following includes definitions of selected terms employed herein. The definitions include various examples and/or forms of components that fall within the scope of a term and that can be used for implementation. The examples are not intended to be limiting.

The term "location" as used herein may refer to a position of an object in space. A location may be indicated using a coordinate system. For example, a location may be represented as a longitude and latitude. In another aspect, a location may include a height.

The term "pose" as used herein may refer to an orientation of an object in space. For example, a pose may include a pitch, yaw, and roll of the object.

The term "localization" may refer to determining a location and/or pose of an object.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected", is one in which signals, physical communications, and/or logical communications can be sent and/or received. An operable connection can include a physical interface, a data interface and/or an electrical interface.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Referring now to the drawings, what is shown therein is for purposes of illustrating one or more example aspects of the disclosure, and not for purposes of limiting the same.

FIG. 1 shows a schematic view of an example operating environment 100 of a localization system 110 and example methods according to an aspect of the disclosure. For example, the localization system 110 may reside within a vehicle 102. The components of the localization system 110, as well as the components of other systems, hardware architectures and software architectures discussed herein, can be combined, omitted or organized into different architectures for various implementations. However, the example aspects of the disclosure discussed herein focus on the environment 100 as illustrated in FIG. 1, with corresponding system components and related methods.

As shown in FIG. 1, the vehicle 102 generally includes an electronic control unit (ECU) 112 that operably controls a plurality of vehicle systems. The vehicle systems may include, but are not limited to, the localization system 110 among others including vehicle HVAC systems, vehicle audio systems, vehicle video systems, vehicle infotainment systems, vehicle telephone systems, and the like. The vehicle localization system 110 may include a vehicle GPS receiver 114 that can also be connected to the ECU 112 to provide a location and pose estimate of the vehicle 102 as described in further detail below. In an alternate aspect, the localization system 110 includes its own processor 122 and memory 124 that communicate with the GPS receiver 114, odometry sensors 116, camera 118, and map database 120 to localize (e.g., determine a location and pose of) the vehicle 102.

The ECU 112 may include internal processing memory, an interface circuit, and bus lines for transferring data, sending commands, and communicating with the vehicle systems. Generally, the ECU 112 includes a processor and memory (not shown). The vehicle 102 may also include a bus for sending data internally between the various components of the localization system 110. The vehicle 102 may further include a communications device 126 (e.g., wireless modem) for providing wired or wireless computer communications utilizing various protocols to send/receive electronic signals internally to features and systems within the vehicle 102 and to external devices. Generally, these protocols include a wireless system (e.g., IEEE 802.11, IEEE 802.15.1 (Bluetooth™)), a near field communication system (NFC) (e.g., ISO 13157), a local area network (LAN), and/or a point-to-point system. Additionally, the communication device of the vehicle 102 is operably connected for internal computer communication via a bus (e.g., a Controller Area Network (CAN) or a Local Interconnect Network (LIN) protocol bus) to facilitate data input and output between the electronic control unit 104 and vehicle features and systems.

The vehicle 102 also includes odometry sensors 116 that can control and provide data regarding movement of the vehicle. For example, the odometry sensors may include an engine control unit (not shown) that provides vehicle speed, idle speed, and engine throttle positions. In an aspect of the disclosure, the odometry sensors 116 may further include a transmission control unit (not shown) to provide data regarding the vehicle transmission (i.e., power train) system. For example, the engine control unit and/or the transmission control unit can provide data to the electronic control unit 112 and/or vehicle systems (e.g., the localization system 110) that the vehicle 102 is or is not in a state of motion.

The odometry sensors 116 may also include but are not limited to a vehicle speed sensor (e.g., wheel speed sensors) and a brake signal sensor. The vehicle speed sensor provides speed data related to the vehicle 102 as it is in operation. In other words, the vehicle speed sensor provides data to the electronic control unit 112 and/or the localization system 110 that the vehicle 102 is or is not in a state of movement. The brake signal sensor can sense signals that are sent from the vehicle braking system and/or a brake light switch to determine when the vehicle brakes are engaged and disengaged by the driver. The brake signal sensor can also include brake pad sensors that provide actuation data each time the brake pads of the vehicle 102 are utilized to provide vehicle braking. The brake signal sensor can also provide information as to when the vehicle 102 is not in a state of movement.

The vehicle 102 also includes a camera 118 for obtaining a camera image of an environment around the vehicle 102. In one aspect, the camera 118 is mounted in a forward facing orientation to obtain an image from a perspective similar to the perspective of the driver. For example, the camera 118 may be mounted near the top of a front windshield of the vehicle 102. The camera 118 may be a digital camera capable of obtaining high quality digital images or video. In an aspect, the camera 118 may be calibrated with respect to the vehicle 102. For example, the camera 118 may be calibrated by obtaining images of a pattern (e.g., a checkerboard pattern) with known dimensions using the camera 118. Calibrating the camera 118 may provide information regarding the relationship between the pose of camera 118 and the pose of vehicle 102.

The vehicle 102 may include a map database 120. In an aspect of the disclosure, the map database 120 may be a computer-readable storage medium storing three-dimensional map data. The three-dimensional map data may be downloaded or updated via communications device 126. For example, the localization system 110 may communicate with a map server (not shown) to obtain three-dimensional map data to store in the map database 120. In an aspect, the three-dimensional map data may include data points corresponding to various features. The features may include both planar (e.g., flat) features and features having a vertical component. For example, the three-dimensional map data may include features such as, but not limited to, continuous and dashed lane markings, curbs, crosswalks, road markings, and traffic signs. The data points may correspond to a real-world feature at a specific location defined by three-dimensional coordinates. The three-dimensional map data may further include annotations identifying the features and/or providing groupings of data points.

Figure 2:
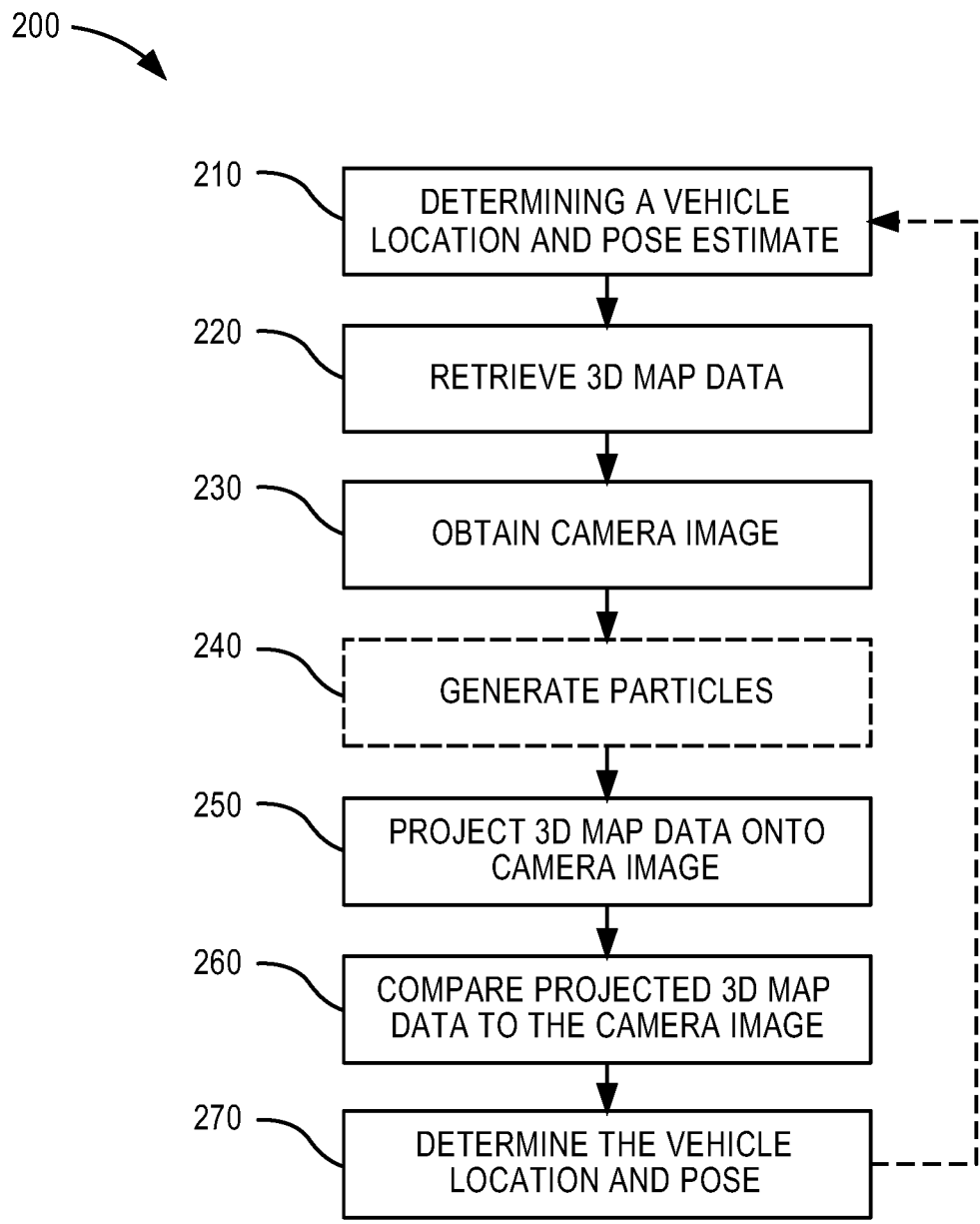
FIG. 2 illustrates a flowchart showing an example method that can be utilized by an example embodiment of the localization system.

Referring now to FIG. 2, an example method that can be utilized by an example aspect of the localization system 110 is illustrated.

In block 210, the method 200 may include determining a location and pose estimate for the vehicle 102. In one aspect, the location and pose estimate may be based on data received from the GPS receiver 114. For example, the location and pose estimate may be the GPS coordinates determined by the GPS receiver 114. In an aspect, a location and pose estimate may not have a factor for each possible degree of freedom for a location and pose. For example, the location and pose estimate may not include a pitch or roll value, or may assume a default value. In another aspect, the location and pose estimate may be based on a previously determined location and pose. The estimate may be determined by applying information regarding vehicle movement obtained from the odometry sensors 116.

In block 220, the method 200 may include retrieving three-dimensional map data based on the location and pose estimate. In an aspect, for example, the three-dimensional map data may be retrieved from the map database 120 based on the location and pose estimate. For example, the map database 120 may provide all data points having locations within a threshold distance of the location estimate. In an aspect, the data points may also be selected based on the pose estimate. For example, only data points for locations in front of the vehicle may be retrieved based on a yaw value.

In block 230, the method 200 may include obtaining a camera image from a vehicle mounted camera. In an aspect, for example, the camera 118 may obtain the camera image. The camera image may be a current image generated by the camera 118 at, for example, the time the location and pose estimate is generated.

In block 240, the method 200 may optionally include generating multiple particles for the location and pose estimate of the vehicle. In an aspect, for example, each particle may represent a hypothesis of a possible location and pose of the vehicle 102 or the camera 118. That is, each particle may be represented as north, east, down, yaw, pitch, and roll coordinates for a valid position of the camera. A probability may be associated with each particle. The particles may be generated based on the location and pose estimate, vehicle odometry information, noise and variation of the location and pose, and/or random or pseudorandom factors. For example, the processor 122 may determine an estimated change in the location and pose estimate from a previous location and pose and the vehicle odometry information. The processor 122 may then apply random or pseudorandom scaling factors to the estimated change to generate a plurality of plausible hypotheses for a new location and pose of the vehicle.

In block 250, the method 200 may include projecting the three-dimensional map data onto the camera image based on the location and pose estimate. In an aspect, for example, the processor 122 may project the three-dimensional map data onto the camera image based on the location and pose estimate. Generally, projecting the three-dimensional map data onto the camera image may include determining a pixel of the camera image where a feature corresponding to a three-dimensional map data point would be expected to occur in the image based on the location and pose estimate. As will be discussed in further detail below regarding FIG. 3, projecting the three-dimensional map data may involve converting the data points from a map space or coordinate system into a camera space or coordinate system. The projection may use intrinsic camera parameters determined during calibration. For example, the projection of a point P having coordinates $XXc=[Xc;Yc;Zc]$ in the camera reference frame may be projected to point $P(x_p,y_p)$ by the following formula:

$$\begin{cases} x_p = fc(1)(x_d(1) + \text{alpha\_c} * x_d(2)) + cc(1) \\ y_p = fc(2)x_d(2) + cc(2) \end{cases} \quad (1)$$

The term "fc" may be a 2×1 vector indicating a focal length parameter. The term "alpha_c" may be a skew coefficient. The term "cc" may be a principal point. The term "$x_d$" may be a normalized image projection after distortion as provided by the following formula:

$$x_d = \begin{bmatrix} x_d(1) \\ x_d(2) \end{bmatrix} = (1 + kc(1)r^2 + kc(2)r^4 + kc(5)r^6)x_n + dx \quad (2)$$

The term "r" may be defined by $r^2=x^2+y^2$. The term "x(n)" may be a normalized image projection. The term dx may be a tangential distortion vector given by the following formula:

$$dx = \begin{bmatrix} 2kc(3)xy + kc(4)(r^2 + 2x^2) \\ kc(3)(r^2 + 2y^2) + 2kc(4)xy \end{bmatrix}$$

The term "xn" may be the normalized image projection given by the following formula:

$$x_n = \begin{bmatrix} X_c/Z_c \\ Y_c/Z_c \end{bmatrix} = \begin{bmatrix} x \\ y \end{bmatrix}$$

In block 260, the method 200 may include comparing the projected three-dimensional map data to the camera image. In an aspect, for example, the processor 122 may compare the projected three-dimensional map data to the camera image. In one aspect, the comparing may use chamfer matching techniques to compare edges of the three-dimensional map data to edges of the camera image. The comparing may also include determining a matching metric that indicates how closely the projected three-dimensional map data matches or correlates with the camera image.

In block 270, the method 200 may include determining the vehicle location and pose based on the comparing. In an aspect, for example, the processor 122 may determine the vehicle location and pose. In one aspect of the disclosure, determining the vehicle location and pose may include selecting a particle with the best matching metric. In an alternative aspect, determining the vehicle location and pose may include determining a correction to the location and pose estimate based on the comparing.

Figure 3:
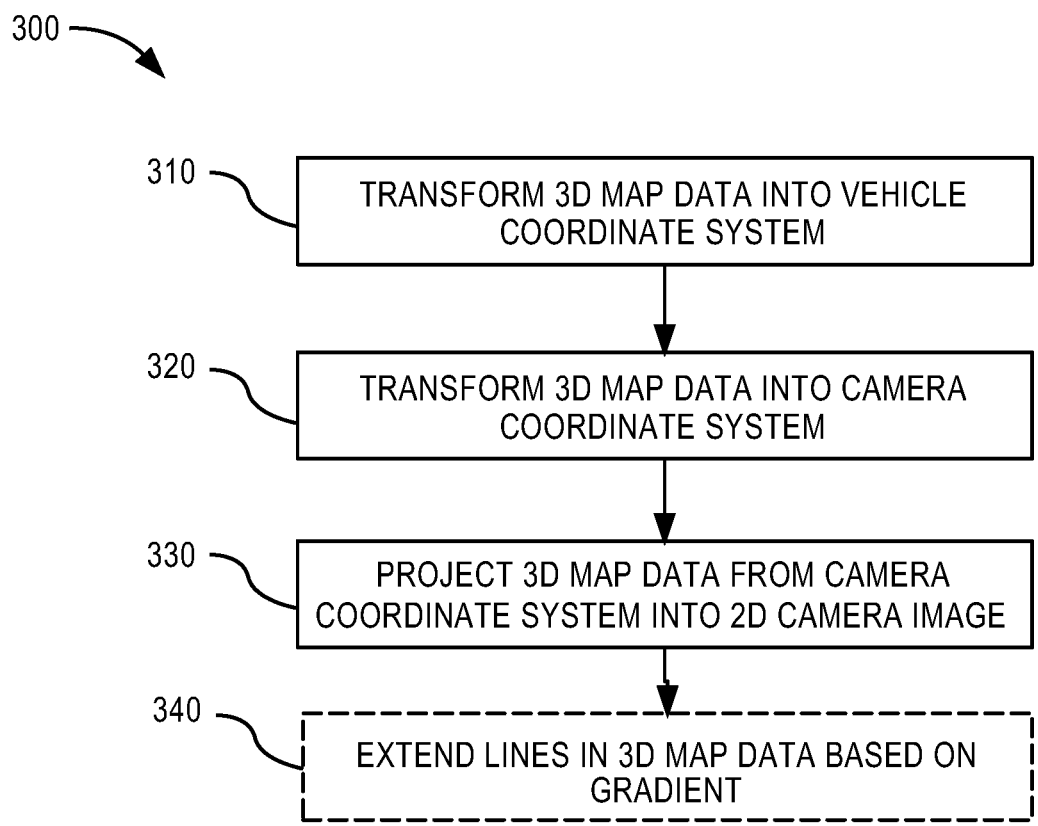
FIG. 3 illustrates a flowchart showing an example method for projecting three-dimensional map data onto a camera image.

Referring now to FIG. 3, an example method 300 that can be utilized by an example variation of the localization system 110 for projecting three-dimensional map data onto a camera image is illustrated. In an aspect, the method 300 may correspond to the block 250 of method 200.

In block 310, the method 300 may include transforming the three-dimensional map data from a map coordinate system to a vehicle coordinate system. In one aspect of the disclosure, the three-dimensional map data may be stored according to a global coordinate system. For example, each data point of the three-dimensional map data may include north, east, and down (NED) coordinates. The NED coordinates may be based on a fixed global origin. The vehicle navigation system may use a different coordinate system. For example, the vehicle navigation system may have an origin at a starting location of the vehicle 102, or a current location of the vehicle 102. The processor 122 may transform the received three-dimensional map data into the vehicle coordinate system by applying a translation based on the different origins.

In block 320, the method 300 may include transforming the map data from the vehicle coordinate system to a camera coordinate system. In an aspect of the disclosure, the camera coordinate system may be rotated with respect to the vehicle coordinate system. For example, the vehicle coordinate system may generally be a top down or birds eye perspective, whereas the camera coordinate system may generally be a forward looking perspective. Accordingly, a height in the vehicle coordinate system may correspond to a vertical coordinate in a camera coordinate system and may depend on the pitch of the camera 118 in relation to the vehicle 102. Similarly, the north and east coordinates may depend on pose of the camera 118 in relation to the vehicle 102. The relationship between the vehicle coordinate system and the camera coordinate system may be established by calibrating the camera 118 using images of known patterns in known positions. The processor 122 may then transform the map data in the vehicle coordinate system into the camera coordinate system.

In block 330, the method 300 may include projecting the three-dimensional map data from the camera coordinate system onto the camera image. Projecting the three-dimensional map data may convert the three-dimensional map data into two-dimensional points (e.g., pixels.) The projecting is based on the location and pose estimate for the camera. In an aspect of the disclosure, each particle may represent a hypothesis for the location and pose, and the projecting may be performed for each particle. In another aspect of the disclosure, a single hypothesis estimator such as a Kalman filter may be used. It should be noted that two or more of the transformations described in blocks 310, 320, and 330 may be combined mathematically to produce a single transformation.

In block 340, the method 300 may optionally include extending projected lines in the three-dimensional map data based on a gradient. In an aspect of the disclosure, the three-dimensional map data may represent a line as a series of data points. When the data points are projected into the camera image, the data points may not be connected. The processor 122 may determine a gradient based on two or more projected data points (e.g., pixels). The processor 122 may then extend the line by determining additional pixels based on the gradient. In an aspect, a line may be extended to a border of the camera image based on the gradient.

Figure 4:
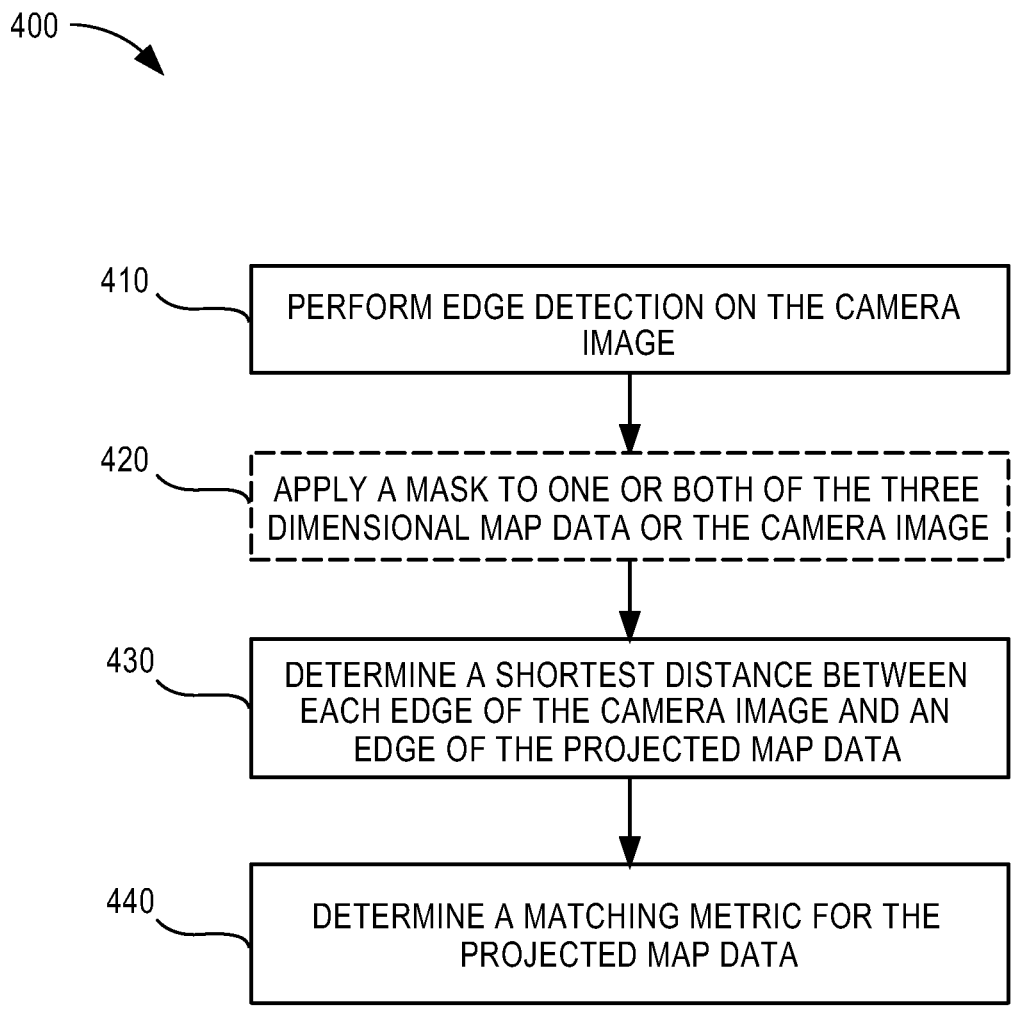
FIG. 4 illustrates a flowchart showing an example method for comparing projected three-dimensional map data to a camera image.

Referring now to FIG. 4, an example method 400 that can be utilized by an example implementation of the localization system 110 for comparing projected three-dimensional map data to the camera image is illustrated. In an aspect, the method 400 may correspond to block 260 of method 200.

In block 410, the method 400 may include performing edge detection on the camera image. Various methods and algorithms for edge detection are known in the art of image processing and may be used by processor 122 to detect edges in the camera image. Generally, edge detection algorithms may determine changes in properties between adjacent pixels to identify edges. In one aspect, performing edge detection produces a set of edges and associated orientations. In an aspect of the disclosure, a generic edge detector such as the Canny edge detector may be used. In another aspect, the edge detector may be tuned to detect edges along road markings or curbs using, for example, a steerable filter. In another aspect, edge detection may also include applying non-maxima suppression to remove outliers. Hysteresis thresholding may also be applied to select connected edges.

In block 420, the method 400 may optionally include applying a mask to one or both of the three-dimensional map data and the camera image. The mask may reduce a number of edges for comparing. For example, the mask may remove edges caused by local minima. As another example, applying a mask may include identifying occluding objects and applying the mask to the occluding objects. For example, if another vehicle is detected in the image, a mask may be applied to the portion of the image blocked by the other vehicle so that edges of the other vehicle are not compared to the projected three-dimensional map data.

In block 430, the method 400 may include determining a shortest distance between edges of the camera image and edges of the projected map data. The shortest distance may be referred to as a chamfer distance. In one aspect, the processor 122 may compare the pixel coordinates of an edge of the camera image to the pixel coordinates of the closest projected map data point. In an aspect, the edges may be matched based on orientation. For example, an edge may only be matched with an edge having a similar orientation (e.g., the orientation of the matched edges may be within a threshold angle). In an aspect, the chamfer distance between edges may be measured as a Manhattan distance (i.e., a sum of a horizontal distance and a vertical distance).

In block 440, the method 400 may include determining a matching metric for the projected map data. The matching metric may be any metric that indicates a degree of similarity between the edges of the camera image and the edges of the projected map data. In one aspect, the matching metric may be a sum of the chamfer distances between matching edges. In an aspect, the matching metric may be based on a portion of the edges (e.g., the closest 90%) to exclude outliers. Further, the masked portions of the camera image and/or projected map data may be excluded when determining the matching metric. As described above, the matching metric may be used in block 270 of method 200 to select a best particle as the current location and pose of the vehicle 102 or of the camera 118.

Figure 5:
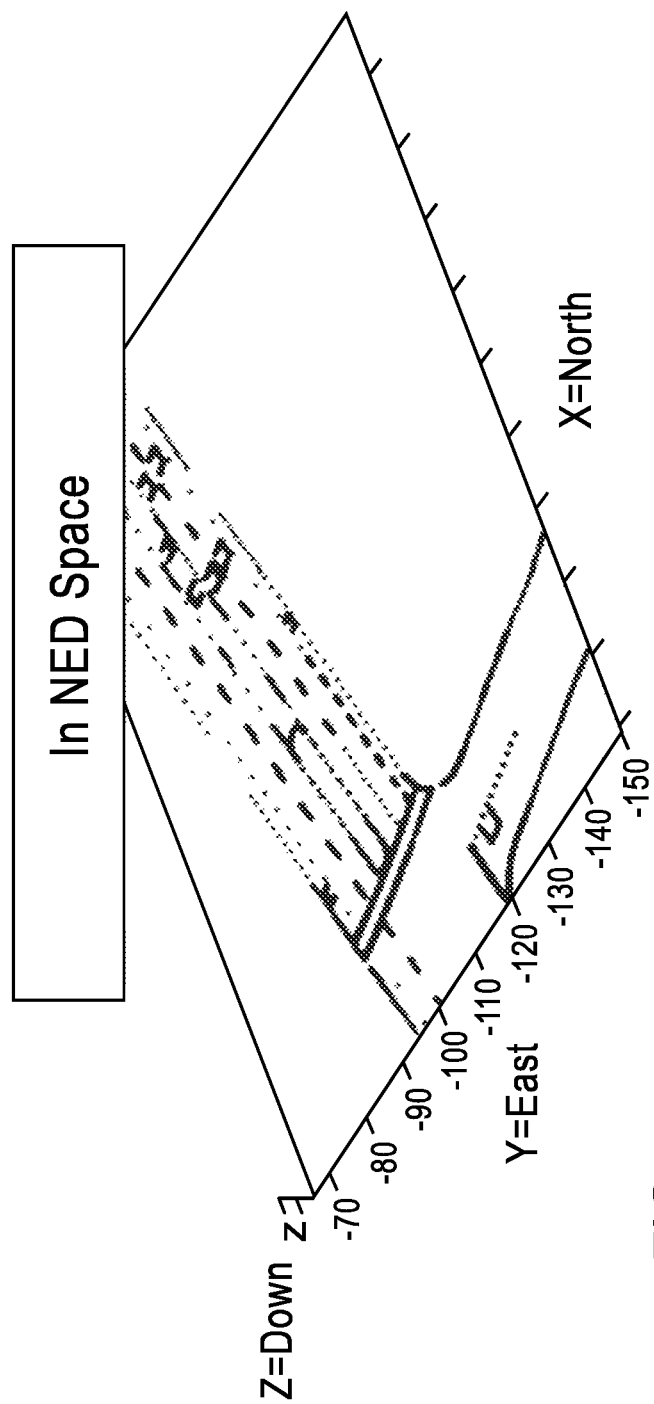
FIG. 5 illustrates an example of three-dimensional map data in a map coordinate system.
Figure 6:
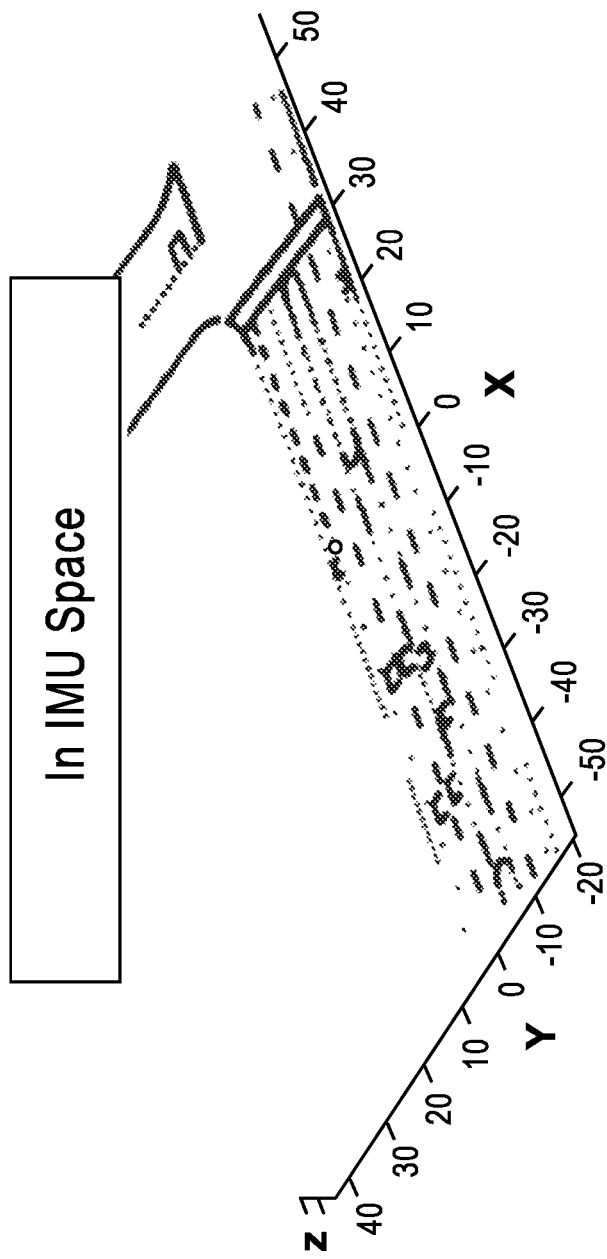
FIG. 6 illustrates an example of three-dimensional map data in a vehicle coordinate system.
Figure 7:
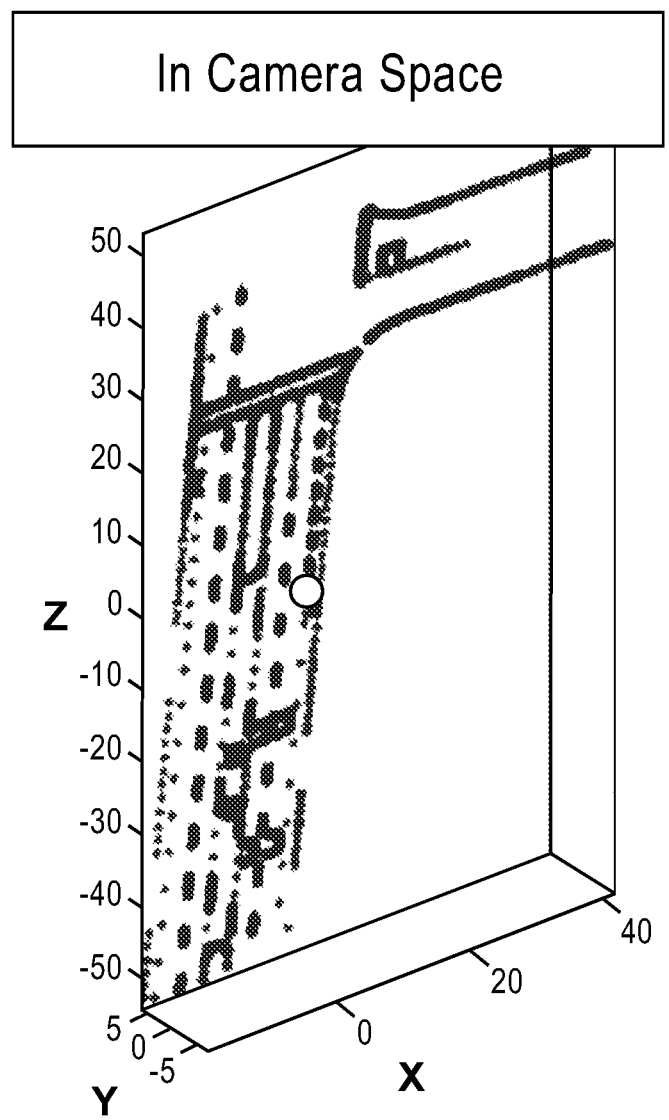
FIG. 7 illustrates an example of three-dimensional map data in a camera coordinate system.

Referring now to FIGS. 5-7 an example of transforming the coordinate system of three-dimensional map data will be described. FIG. 5 illustrates an example of three-dimensional map data as stored in a map database according to an aspect. The three-dimensional map data includes an intersection or two multi-lane roads. The curbs, lane markings, and crosswalks are included as data points in the three-dimensional map data. As illustrated, a north coordinate may be associated with the x-axis, an east coordinate may be associated with the y-axis, and a down coordinate may be associated with the z-axis. In the illustrated example, the roads may not run directly north or east.

FIG. 6 illustrates an example of the three-dimensional map data in a vehicle coordinate system. As illustrated in FIG. 6, the vehicle 102 may be located at the origin of the coordinate system. Moreover, the axis of the coordinate system may be aligned with the axis of the vehicle 102. Accordingly, as illustrated, the roads may be aligned with the axes of the coordinate system (assuming the car is travelling along the road). For example, the x-axis may indicate a distance in front of the vehicle 102, the y-axis may indicate a distance to the side of the vehicle 102, and the vehicle 102, and the z axis may indicate a distance above or below the vehicle 102. FIG. 7 illustrates the three-dimensional map data in a camera coordinate system. In this case, the camera position (which may be the same as the vehicle position) may be located at the origin of the coordinate system. The camera coordinate system may be from a forward looking perspective rather than a bird's eye view perspective. For example, as illustrated, the x axis may correspond to a distance to the side of the camera, the y axis may correspond to a distance above or below the camera, and the z-axis may correspond to a distance in front of the camera. The transformations between the coordinate systems may be determined by the processor 122 using linear transformations based on the specific coordinate systems used.

Figure 8:
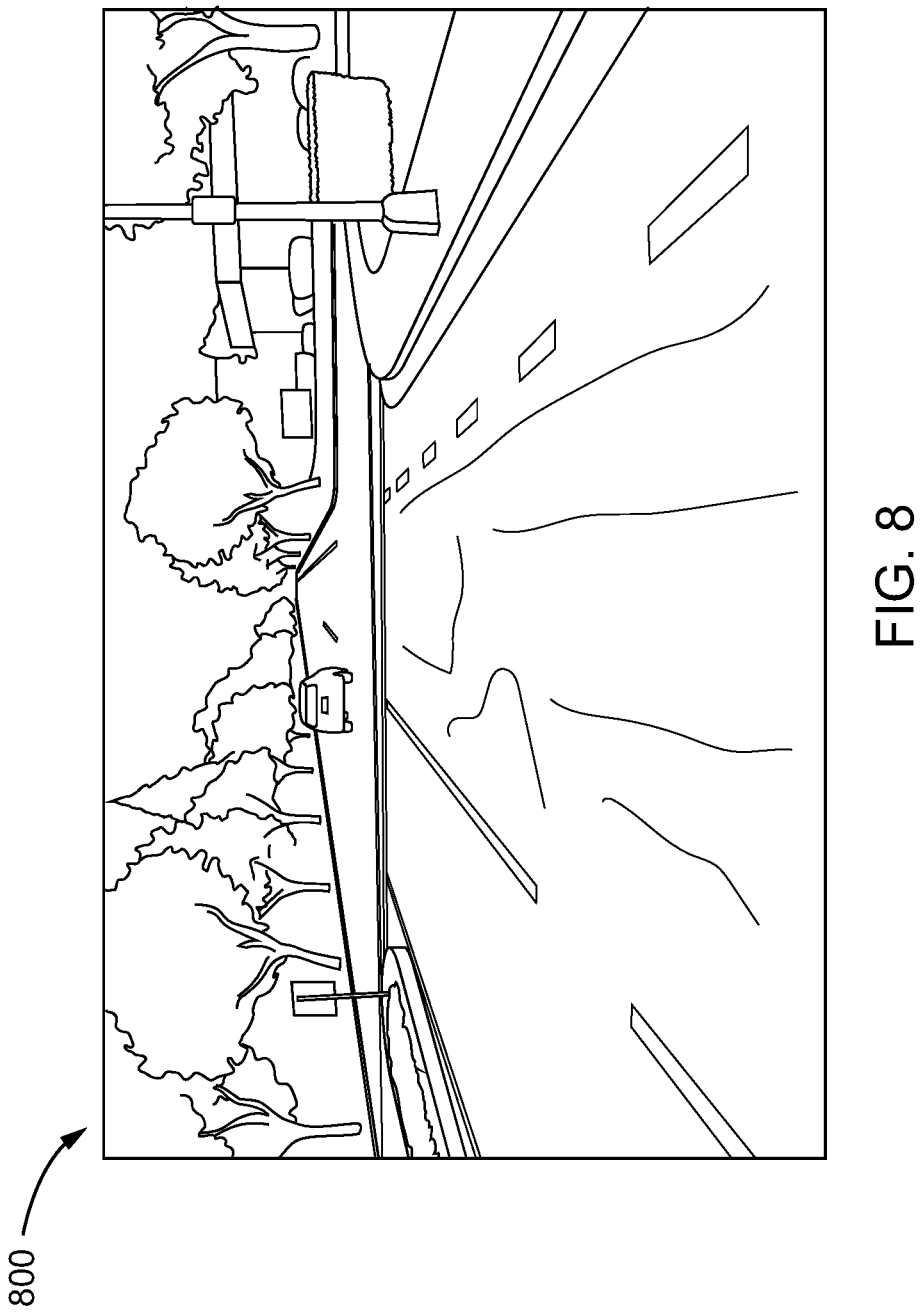
FIG. 8 illustrates an example of a camera image corresponding to the map data of FIGS. 5-7.
Figure 9:
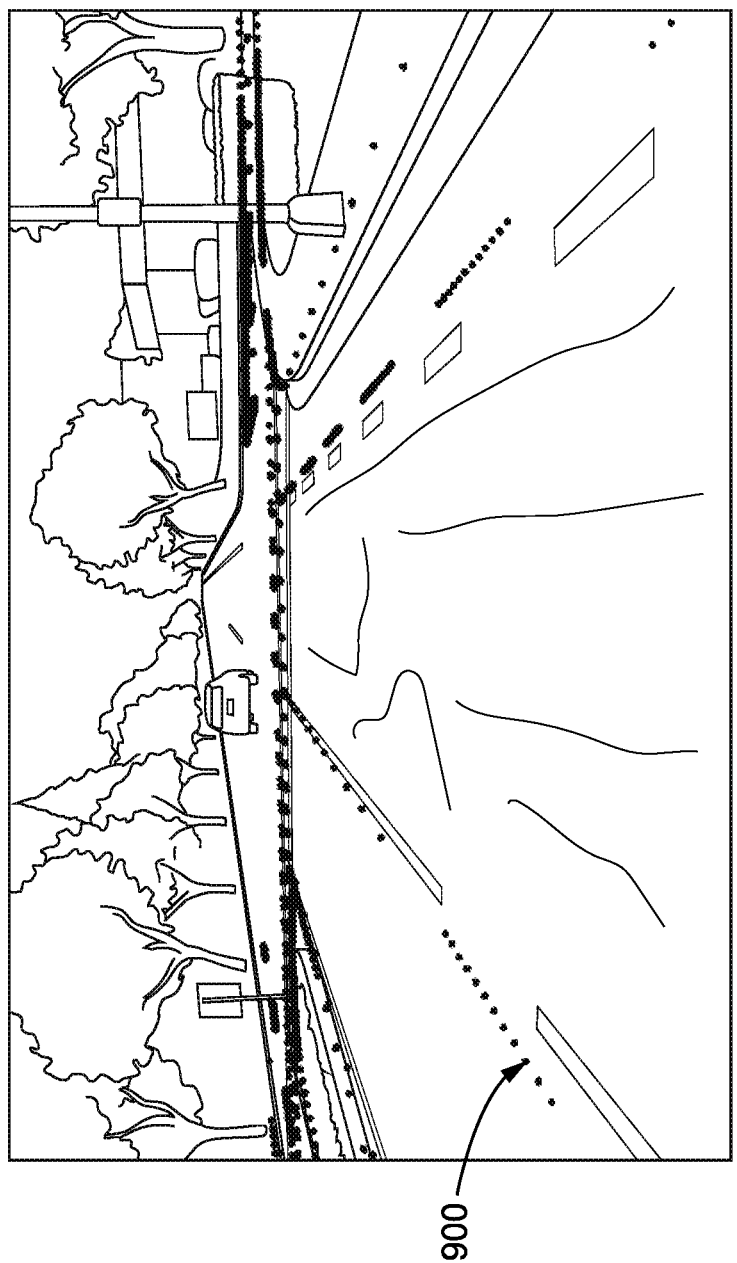
FIG. 9 illustrates an example of a projection of the map data onto a camera image.
Figure 10:
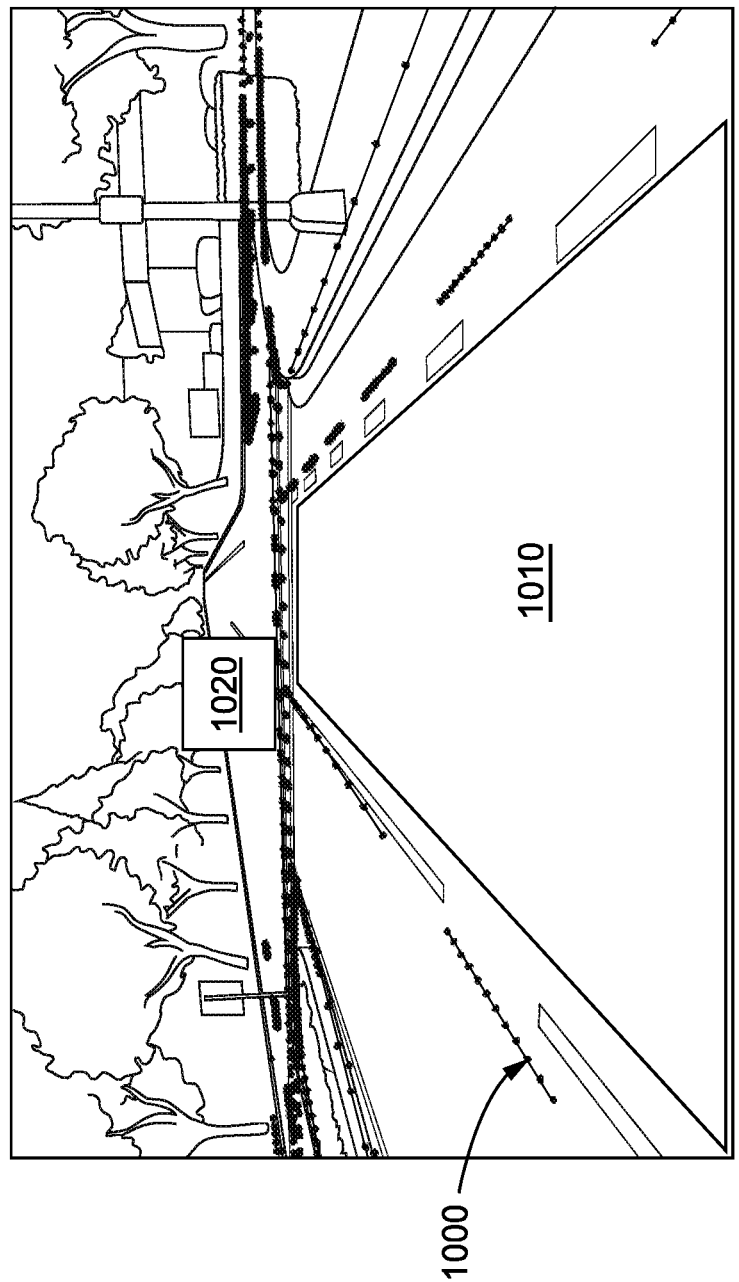
FIG. 10 illustrates an example of a masked camera image and extended map data.

Referring now to FIGS. 8-10, an example of edge matching will be described. FIG. 8 illustrates an example of a camera image 800. The camera image 800 may be obtained from the camera 118 and may be from a perspective similar to the perspective of a driver of the vehicle 102. In an aspect, the camera image in FIG. 8 may be an image of the same intersection as in the three-dimensional map data illustrated in FIGS. 5-7. FIG. 9 illustrates the three-dimensional map data projected onto the camera image 800 according to a first particle or a first location and pose estimate. As illustrated the projected data points 900 of the three-dimensional map data may be projected as individual pixels in the camera image.

Figure 11:
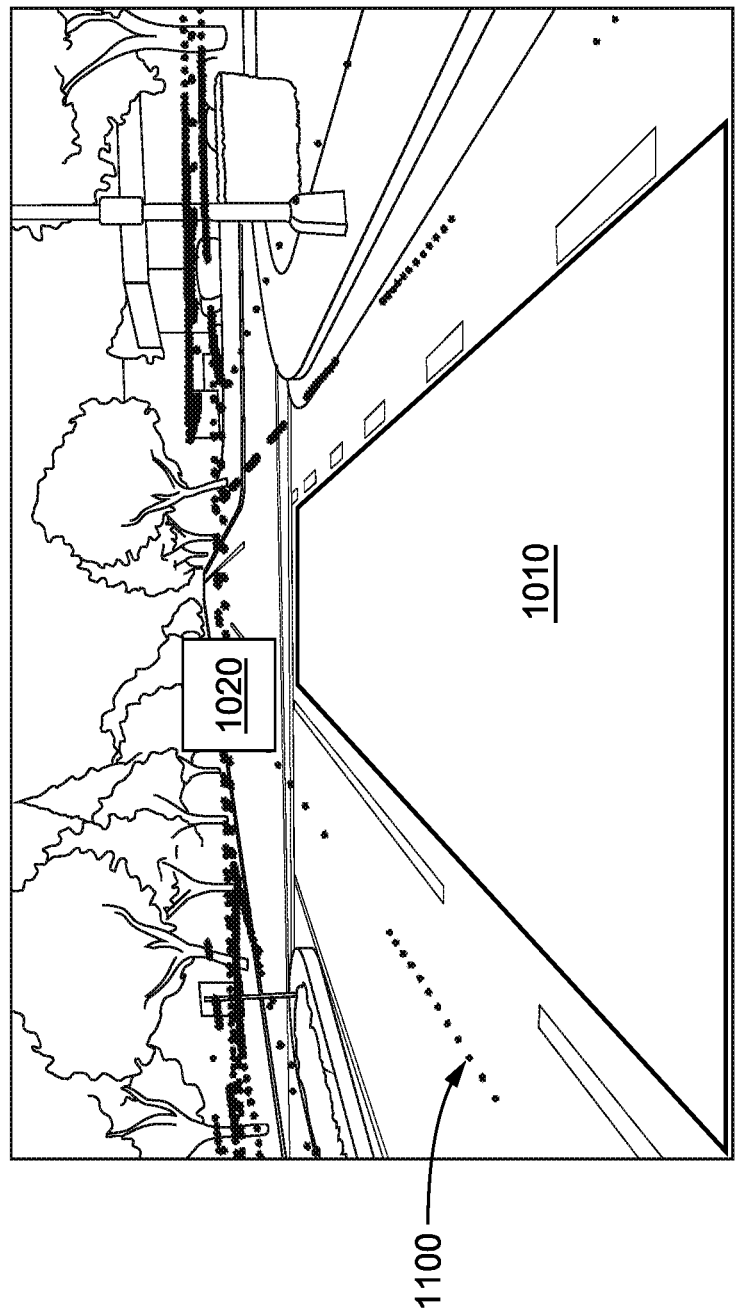
FIG. 11 illustrates another example of a different projection of map data onto a camera image.

FIG. 10 illustrates an example of the camera image 800 and projected data points 900 after masking and extending lines. For example, the mask 1010 may remove local minima in the camera image 800 caused by cracks in the road. As another example, the mask 1020 may remove another vehicle on the road (which would not be in the map data). Further, the individual points of the projected data points 900 may be connected by extending the lines. As illustrated in FIG. 10, the projected data points 900 may generally be aligned with the road markings and curbs in the camera image 800. In contrast, FIG. 11 illustrates another set of projected data points 1100 based on a different particle or different location and pose estimate. As illustrated in FIG. 11, the projected data points 1100 may be generally shifted forward and to the left from the land markings and curbs of the camera image 800. Accordingly, based on a matching metric, the processor 122 may determine that the particle corresponding to the projected data points 900 is a better particle than the particle corresponding to the projected data points 1100. Therefore, the processor 122 may determine that the location and pose of the particle corresponding to the projected data points 900 is the current location and pose of the vehicle 102 or camera 118.

Figure 12:
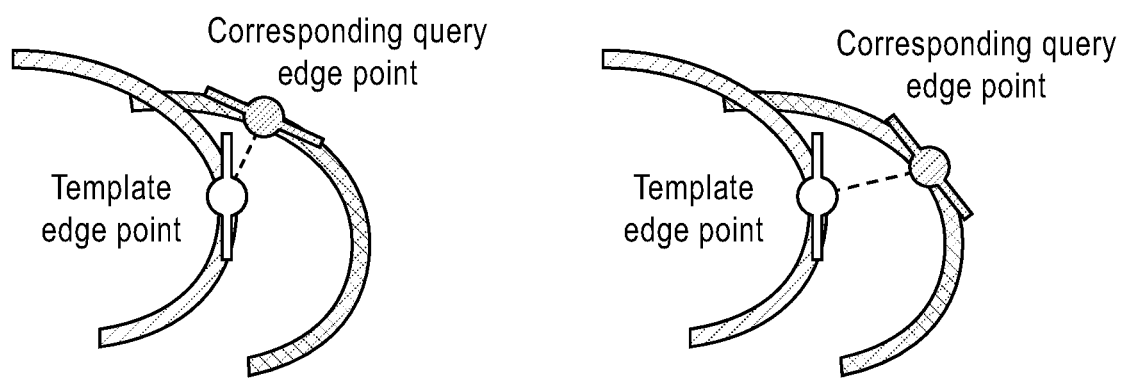
FIG. 12 illustrates examples of matching edges based on orientation.

FIG. 12 illustrates examples of matching edges based on orientation of the edges. In the example on the left, the edges may be matched without considering orientation. Accordingly, the template edge point may be matched with a corresponding image edge point based on the shortest distance. Matching without considering orientation may lead to multiple template points matched to the same image edge points and a general underestimation of a matching metric. In the example on the right, the edges may be matched considering orientation. Accordingly, each template edge point may be matched with a corresponding image edge point having a similar orientation. For example, the orientation of the edges may be within a threshold angle of each other. As illustrated in the example on the right, the corresponding image edge point having a similar orientation may be further away than the closest edge point. However, the distance illustrated in the example on the right may be a more accurate metric for determining the correlation of the template edge and the image edge.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. An example of such a computer system 1300 is shown in FIG. 13.

Figure 13:
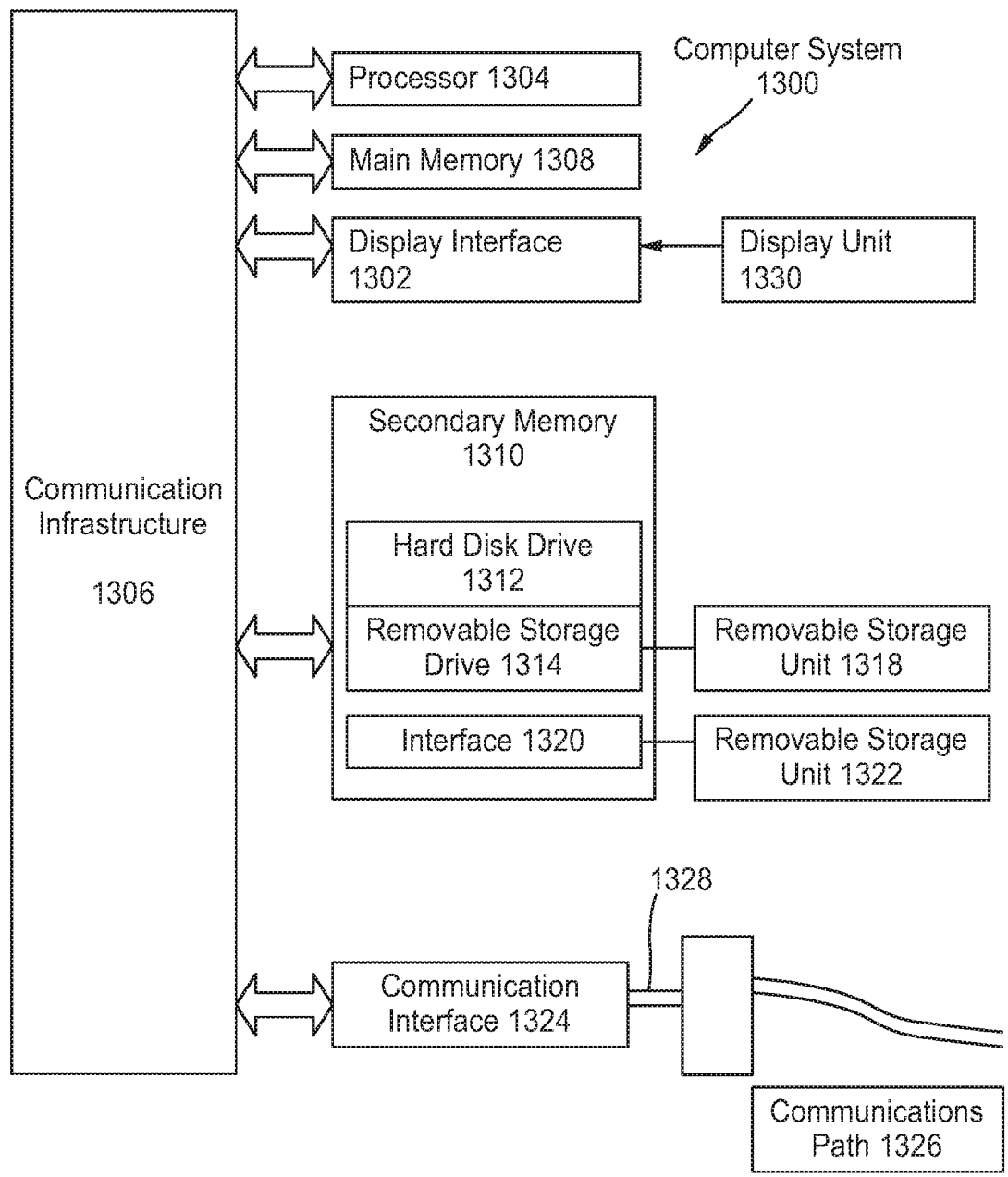
FIG. 13 presents an exemplary system diagram of various hardware components and other features, for use in accordance with aspects of the present disclosure.

FIG. 13 presents an example system diagram of various hardware components and other features, for use in accordance with an aspect of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 1300 is shown in FIG. 13.

Computer system 1300 includes one or more processors, such as processor 1304. The processor 1304 is connected to a communication infrastructure 1306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 1300 may include a display interface 1302 that forwards graphics, text, and other data from the communication infrastructure 1306 (or from a frame buffer not shown) for display on a display unit 1330. Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well-known manner. Removable storage unit 1318, represents a floppy disk, magnetic tape, optical disk, etc., which is read by and written to removable storage drive 1314. As will be appreciated, the removable storage unit 1318 includes a computer usable storage medium having stored therein computer software and/or data.

In alternative aspects, secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328, which may be electronic, electromagnetic, optical or other signals capable of being received by communications interface 1324. These signals 1328 are provided to communications interface 1324 via a communications path (e.g., channel) 1326. This path 1326 carries signals 1328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1380, a hard disk installed in hard disk drive 1370, and signals 1328. These computer program products provide software to the computer system 1300. Aspects of the disclosure are directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform various features in accordance with aspects of the present disclosure, as discussed herein. In particular, the computer programs, when executed, enable the processor 1310 to perform such features. Accordingly, such computer programs represent controllers of the computer system 1300.

In variations where aspects of the disclosure are implemented using software, the software may be stored in a computer program product and loaded into computer system 1300 using removable storage drive 1314, hard drive 1312, or communications interface 1320. The control logic (software), when executed by the processor 1304, causes the processor 1304 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 14:
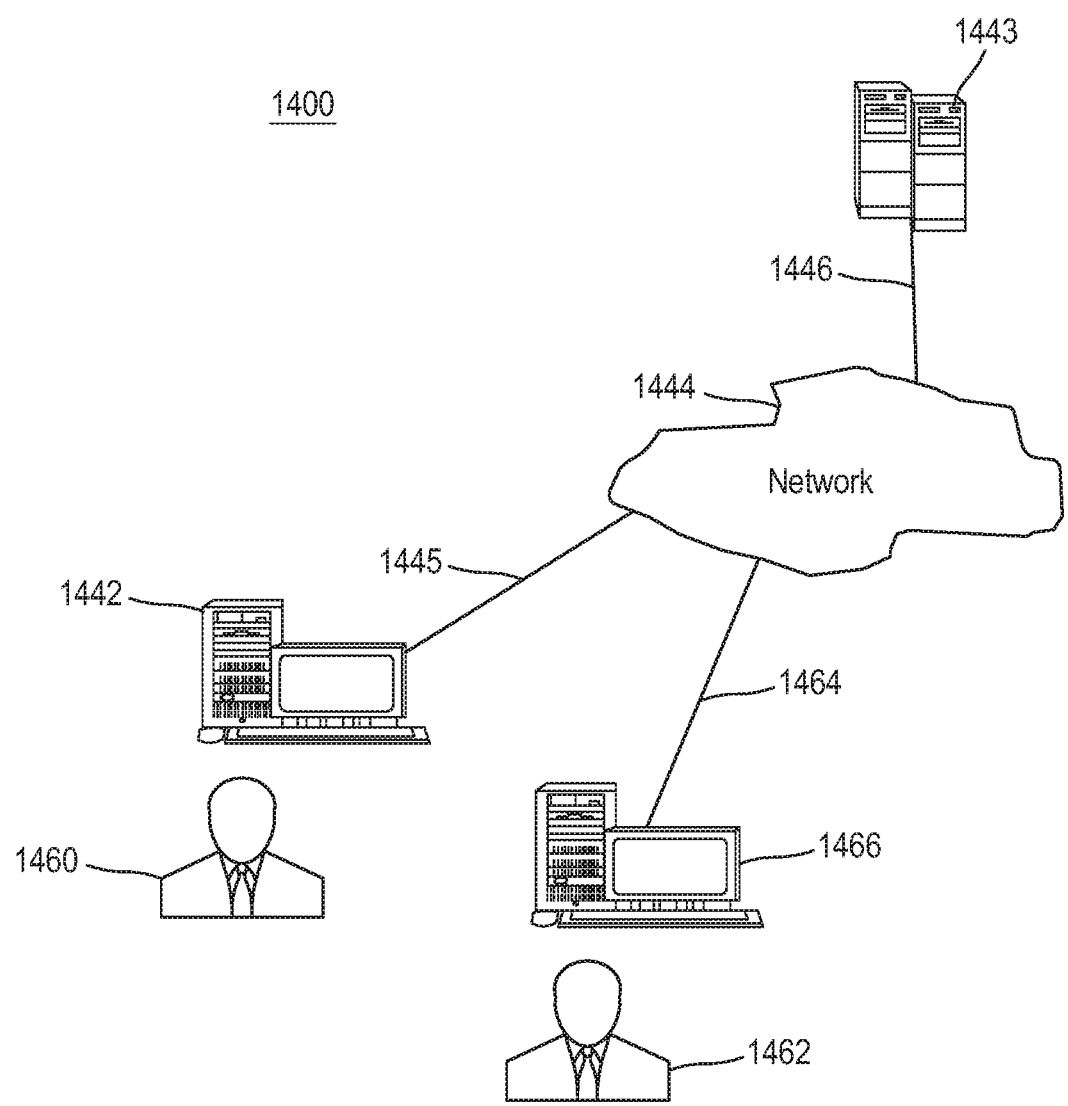
FIG. 14 is a block diagram of various exemplary system components, in accordance with aspects of the present disclosure.

FIG. 14 is a block diagram of various example system components, in accordance with an aspect of the present disclosure. FIG. 14 shows a communication system 1400 usable in accordance with the present disclosure. The communication system 1400 includes one or more accessors 1460, 1462 (also referred to interchangeably herein as one or more "users") and one or more terminals 1442, 1466. In one aspect, data for use in accordance with aspects of the present disclosure is, for example, input and/or accessed by accessors 1460, 1462 via terminals 1442, 1466, such as personal computers (PCs), minicomputers, mainframe computers, microcomputers, telephonic devices, or wireless devices, such as personal digital assistants ("PDAs") or a hand-held wireless devices coupled to a server 1443, such as a PC, minicomputer, mainframe computer, microcomputer, or other device having a processor and a repository for data and/or connection to a repository for data, via, for example, a network 1444, such as the Internet or an intranet, and couplings 1445, 1446, 1464. The couplings 1445, 1446, 1464 include, for example, wired, wireless, or fiberoptic links. In another example variation, the method and system in accordance with aspects of the present disclosure operate in a stand-alone environment, such as on a single terminal.

The aspects of the disclosure discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method of determining a vehicle location and pose, comprising:
   determining a location and pose estimate;
   retrieving three-dimensional map data based on the location and pose estimate;
   obtaining a camera image from a vehicle mounted camera;
   projecting the three-dimensional map data onto the camera image based on the location and pose estimate;
   comparing the projected three-dimensional map data to the camera image; and
   determining the vehicle location and pose based on the comparing, wherein projecting the three-dimensional map data onto the camera image comprises:
      transforming the three-dimensional map data from a map coordinate system to a vehicle coordinate system;
      transforming the map data from the vehicle coordinate system to a camera coordinate system; and
      projecting the three-dimensional map data from the camera coordinate system onto the camera image.

2. The method of claim 1, wherein transforming the map data from the vehicle coordinate system to a camera coordinate system is based on a camera calibration.

3. The method of claim 1, wherein comparing the projected three-dimensional map data to the camera image includes matching edges of the camera image with edges of the projected three-dimensional map data.

4. The method of claim 3, wherein the matching edges comprises:
performing edge detection on the camera image to determine a set of edges of the camera image; and
determining a shortest distance between each edge of the set of edges of the camera image and an edge of the projected map data.

5. The method of claim 4, wherein an orientation of the edge of the camera image is within a threshold angle of the edge of the projected map data.

6. The method of claim 1, further comprising:
generating multiple particles for the location and pose estimate of the vehicle, wherein comparing the projected three-dimensional map data to the camera image includes:
determining a matching metric for each particle; and
selecting a particle with a best matching metric.

7. The method of claim 1, wherein the matching metric is a chamfer distance metric.

8. The method of claim 1, further comprising applying a mask to one or both of the three-dimensional map data or the camera image, the mask reducing a number of edges for the comparing.

9. The method of claim 1, wherein projecting the three-dimensional map data onto the camera image includes:
determining a gradient of a line in the projected map data;
assigning the gradient to any pixels along the line; and
extending the line to an edge of the camera image using the gradient.

10. A system for determining a location and pose of a vehicle, comprising:
a global positioning system receiver configured to determine a location and pose estimate for the vehicle;
a map database configured to provide three-dimensional map data based on the location and pose estimate;
a vehicle mounted camera configured to obtain a camera image;
a processor communicatively coupled to a memory, the processor configured to:
project the three-dimensional map data onto the camera image based on the location and pose estimate;
compare the projected three-dimensional map data to the camera image; and
determine the vehicle location and pose based on the comparing, wherein to project the three-dimensional map data, the processor is further configured to:
transform the three-dimensional map data from a map coordinate system to a vehicle coordinate system;
transform the map data from the vehicle coordinate system to a camera coordinate system; and
project the three-dimensional map data from the camera coordinate system onto the camera image.

11. The system of claim 10, wherein the processor is further configured to transform the map data from the vehicle coordinate system to the camera coordinate system based on a camera calibration.

12. The system of claim 10, wherein the processor is further configured to compare the projected three-dimensional map data to the camera image by matching edges of the camera image with edges of the projected three-dimensional map data.

13. The system of claim 12, wherein processor is further configured to:
perform edge detection on the camera image to determine a set of edges of the camera image; and
determine a shortest distance between each edge of the set of edges of the camera image and an edge of the projected map data.

14. The system of claim 13, wherein the processor is further configured to determine that an orientation of the edge of the camera image is within a threshold angle of the edge of the projected map data.

15. The system of claim 10, wherein the processor is further configured to:
generate multiple particles for the location and pose estimate of the vehicle, determine a matching metric for each particle; and
selecting a particle with a best matching metric.

16. The system of claim 10, wherein the matching metric is a chamfer distance metric.

17. The method of claim 10, wherein the processor is further configured to apply a mask to one or both of the three-dimensional map data or the camera image, the mask reducing a number of edges for the comparing.

18. A non-transitory computer-readable medium storing computer executable code for determining a vehicle location and pose, comprising code for:
determining a location and pose estimate;
retrieving three-dimensional map data based on the location and pose estimate;
obtaining a camera image from a vehicle mounted camera;
projecting the three-dimensional map data onto the camera image based on the location and pose estimate;
comparing the projected three-dimensional map data to the camera image; and determining the vehicle location and pose based on the comparing, wherein projecting the three-dimensional map data onto the camera image comprises:
transforming the three-dimensional map data from a map coordinate system to a vehicle coordinate system;
transforming the map data from the vehicle coordinate system to a camera coordinate system; and
projecting the three-dimensional map data from the camera coordinate system onto the camera image.

* * * * *